(12) United States Patent
Janak et al.

(10) Patent No.: US 6,584,954 B2
(45) Date of Patent: Jul. 1, 2003

(54) USE OF EXTERNAL EXHAUST GAS RECIRCULATION ("EGR") TO IMPROVE COMPRESSION RELEASE BRAKING AND METHOD FOR EGR VALVE AND SYSTEM CLEANING

(76) Inventors: Robb Janak, 255 Gulf Rd., Somers, CT (US) 06071; Neil Fuchs, 70 Whitebeck Rd., New Hartford, CT (US) 06057

( * ) Notice: Subject to any disclaimer, the term of this patent is extended or adjusted under 35 U.S.C. 154(b) by 0 days.

(21) Appl. No.: 09/822,203

(22) Filed: Apr. 2, 2001

(65) Prior Publication Data

US 2002/0023619 A1 Feb. 28, 2002

Related U.S. Application Data

(60) Provisional application No. 60/193,366, filed on Mar. 31, 2000.

(51) Int. Cl.⁷ .............................................. F02M 25/07
(52) U.S. Cl. .................................. 123/321; 123/568.12
(58) Field of Search ....................... 123/568.11, 568.12, 123/568.14, 320, 323; 60/605.1, 605.2

(56) References Cited

U.S. PATENT DOCUMENTS 5,146,890 A 9/1992 Gobert et al.
6,328,003 B1 * 12/2001 Gaertner et al. ....... 123/568.12

\* cited by examiner

*Primary Examiner*—Henry C. Yuen
*Assistant Examiner*—Arnold Castro

(57) ABSTRACT

In an internal combustion engine comprising a gas recirculation passage connecting an exhaust manifold to an intake manifold, a compression release valve, and at least one gas pulse created during a first event, a method for retarding the engine comprising the steps of opening the compression release valve, releasing at least one gas pulse into the gas recirculation passage after a first event, redirecting the at least one gas pulse into the intake manifold, and using the at least one gas pulse to increase air charge in a cylinder.

14 Claims, 7 Drawing Sheets

USE OF EXTERNAL EXHAUST GAS RECIRCULATION ("EGR") TO IMPROVE COMPRESSION RELEASE BRAKING AND METHOD FOR EGR VALVE AND SYSTEM CLEANING

CROSS-REFERENCE TO RELATED APPLICATIONS

This application relates to and claims priority on U.S. Provisional Application Serial No. 60/193,366, filed Mar. 31, 2000 and entitled "Use of External Exhaust Gas Recirculation ("EGR") to Improve Compression Release Braking and Method For EGR Valve and System Cleaning."

FIELD OF THE INVENTION

The present invention relates generally to valve actuation in internal combustion engines that include compression release-type engine retarders. In particular, it relates to a valve actuation system that uses both compression release and exhaust gas recirculation ("EGR") to improve compression release braking performance and to assist in cleaning the EGR valve and system.

BACKGROUND OF THE INVENTION

Compression release-type engine braking or retarder systems are well-known in the art. Engine retarders temporarily convert an internal combustion engine of the compression ignition type into an air compressor in order to slow the engine. A compression release retarder decreases the kinetic energy of an engine by opposing the upward motion of the engine's pistons on the compression stroke. As a piston travels upward on its compression upstroke, the gases that are trapped in the cylinder are compressed. The compressed gases oppose the upward motion of the piston. When the piston nears the top of its stroke, an exhaust valve is opened to release the compressed gasses. After the pressure has been released from the cylinder, the piston cannot recapture the energy stored in the compressed gases on the subsequent expansion downstroke.

The braking system provides the operator with increased control over the vehicle. Properly designed and adjusted compression release-type engine retarders can generate retarding power equal in magnitude to a substantial portion of the power generated during positive power operations. Compression release-type retarders of this type supplement the braking capacity of the primary vehicle wheel braking system. Engine retarders may substantially extend the life of the primary wheel braking system of the vehicle.

The hydraulic valve control systems of compression release engine retarders have a number of components. A solenoid valve is typically provided to control the supply of engine oil to the hydraulic circuit of the compression release engine retarder. A master piston engages the hydraulic valve control system, typically at a rocker arm or cam. The master piston is linked to a slave piston through a hydraulic circuit. The slave piston is connected to an exhaust valve of the engine. When the compression release retarder is actuated, the rocker arm or cam lobe pushes against the master piston. The motion of the master piston is transferred to the slave piston through the hydraulic circuit, causing the slave piston to actuate and open the exhaust valve at a point near the end of the compression stroke.

Much of the potential energy created by compressing the gas in the cylinder is not recovered during the subsequent expansion or power stroke of the engine. Instead, it is dissipated through the exhaust and radiator systems of the engine. By dissipating the energy developed by compressing the cylinder charge, the compression release-type retarder slows the vehicle down.

As the market for lost motion-type compression release retarders has developed, engine manufacturers have sought ways to improve compression release retarder performance and efficiency. Environmental restrictions, in particular, have forced engine manufacturers to explore a variety of new ways to improve the efficiency of their engines. These changes have forced a number of engine modifications. Engines have become smaller and more fuel efficient. Yet, the demands on retarder performance have often increased, requiring the compression release engine retarder to generate greater amounts of retarding horsepower under more limiting conditions.

The focus of engine retarder development has been toward a number of goals: securing higher retarding horsepower from the compression release retarder, working with, in some cases, lower masses of air deliverable to the cylinders through the intake system; and the inter-relation of various collateral or ancillary equipment, such as: silencers; turbochargers; and exhaust brakes. In addition, the market for compression release engine retarders has moved from the after-market, to original equipment manufacturers. Engine manufacturers have shown an increased willingness to make design modifications to their engines that would increase the performance and reliability and broaden the operating parameters of the compression release engine retarder.

One way of increasing the braking power of compression release engine retarders is to carry out EGR in combination with the compression release braking. EGR denotes the process of briefly opening the exhaust valve at the beginning of the compression stroke of the piston. Opening of the exhaust valve at this time permits higher pressure exhaust gas from the exhaust manifold to recirculate back into the cylinder. The recirculated exhaust gas increases the total gas mass in the cylinder at time of the subsequent compression release event, thereby increasing the braking effect realized by the compression release event.

The effectiveness of engine braking can be improved through the use of EGR. The exhaust gas may be recirculated into the cylinder at the time when the cylinder's piston is at or near Bottom Dead Center ("BDC") at the beginning of the normal compression stroke. EGR allows a greater volume of air to be admitted to the cylinder. Consequently, the engine works harder compressing the denser air volume, and superior braking is achieved. EGR may also be employed during normal positive power operation. The benefits derived from positive power EGR are primarily reduced exhaust gas emissions.

Engine efficiency and performance may be maximized through the use of variably timed positive and negative power EGR events. Similarly, braking performance may be enhanced through two-cycle braking. A lost motion system may be used to implement these operations. In a lost motion system, working fluid is drained and added at precise times to the hydraulic link between the master piston and slave piston. The engine valve profile may be modified by modifying the motion of the master piston, which follows a cam, prior to its transfer to the slave piston. In this way, variable timing is achieved. Variable timed positive and negative power EGR, as well as two-cycle braking, may be difficult to achieve on an exhaust valve cam already crowded with a main exhaust event lobe and a compression release brake event lobe because of inadequate base circle "residence time." Residence time refers to the amount of time at which the cam presents a zero lift profile to the cam follower or master piston. This time is generally proportional to the amount of space on the cam not taken up by different lobes.

An example of a lost motion system and method used to obtain retarding and exhaust gas recirculation is provided by the Gobert, U.S. Pat. No. 5,146,890 (Sep. 15, 1992) for a Method And A Device For Engine Braking A Four Stroke Internal Combustion Engine, assigned to AB Volvo, and incorporated herein by reference. Gobert discloses a method of conducting exhaust gas recirculation by placing the cylinder in communication with the exhaust system during the first part of the compression stroke and optionally also during the latter part of the inlet stroke. Gobert uses a lost motion system to enable and disable retarding and exhaust gas recirculation, but such system is not variable within an engine cycle.

Currently external EGR systems are being provided by turbo design and manufacturing businesses. There have been other attempts to redirect the exhaust gases directly with a dedicated by-pass for engine braking. This is described as a difficult problem by the industry. EGR systems are needed that can utilize existing hardware for EGR and to also adapt braking gas recirculation ("BGR") where braking pulses may be used to charge engine cylinders through the use of engine back-pressure and an auxiliary exhaust opening event.

EGR systems (valves, inter-coolers, and passages) tend to become very sooted over their life-cycle. Soot accumulation will reduce the overall performance of the system, and could actually make the EGR valve unable to close, which decreases fuel economy, performance, and possible federal emissions requirements. This is also true for the inter-cooler which will continue to become clogged, which will reduce the desired EGR rate, and cooling temperature. The primary approach to his problem has been to institute regular maintenance and cleaning intervals which are very undesirable to the long-haul heavy duty truck business. It is also problematic because of the physical difficulty involved with the cleaning of this system.

There is a need in the industry to provide a method and apparatus to improve compression release braking either in the full range or for mid-range speeds without the need for additional engine hardware. There is also a need in the industry to improve the retarding performance and braking power of compression release engine brakes. There is also a need in the industry to provide a system, method or apparatus to provide different levels of engine braking and to optimize engine braking with engine speed.

There is a need in the industry to develop systems to reduce engine braking noise and to avoid overheating of the exhaust system during braking and positive power operations. There is also a need in the industry to improve methods for EGR and to provide a method to quickly return to positive power at the completion of engine braking. There is also a need in the industry to control emissions by recirculating exhaust gases to the engine cylinders. As a result of the shortcomings of existing engine valve actuation and EGR systems, there is a need for a system which may accommodate all valve events necessary for efficient engine operation, including EGR, compression release braking and positive power operations.

SUMMARY OF THE INVENTION

In response to the foregoing challenge, Applicants have developed an innovative, economical method for retarding an internal combustion engine, comprising the steps of: providing a gas recirculation passage connecting a first member to an intake manifold; providing at least one compression release means associated with the gas recirculation passage and the first member; creating a first at least one compression event; opening a first compression release means; releasing the first at least one compression event from the first member into the gas recirculation passage after a first event; redirecting the first at least one compression event into the intake manifold; and using the first at least one compression event to increase air charge in a cylinder.

The method may further comprise the step of providing a gas cooling means associated with the gas recirculation passage and cooling the first at least one compression event. The method may also further comprise the steps of providing a gas cooling means associated with the gas recirculation passage and by-passing the gas cooling means.

The method may also comprise the step of restricting the intake of air by the intake manifold during the step of redirecting the first at least one compression event. The method may also comprise the steps of providing a compression creating system associated with the gas recirculation passage, providing a means for timing the release of a second at least one compression event, creating the second at least one compression event, opening a second compression release means, releasing a second at least one compression event into the gas recirculation passage after the first event, and redirecting the second at least one compression event into the intake manifold.

The method may also comprise the step of using the second at least one compression event to clean an exhaust gas recirculation system. The method may also comprise the step of using the second at least one compression event to clean the intake manifold.

Applicants have also developed an innovative and economical internal combustion engine retarding system, comprising: a gas recirculation passage connecting a first member to an intake manifold; at least one compression release means; and at least one gas pulse created during a first event. The system may further comprise: a gas cooling means associated with the gas recirculation passage. The system may further comprise a means for by-passing the gas cooling means.

The first member may comprise an exhaust manifold or a compression release braking system. The gas recirculation passage may comprise an external gas recirculation passage or a direct exhaust gas recirculation passage. The system may further comprise a variable geometry turbo means. The system wherein the gas recirculation passage may extend through the variable geometry turbo means. The system wherein the exhaust gas recirculation passage may extend through a valve. The system may further comprise a means for restricting the intake of air associated with the intake manifold.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention, and together with the detailed description serve to explain the principles of the present invention.

OBJECTS OF THE INVENTION

It is therefore an object of the present invention to provide a method and apparatus to improve braking either for the full range, or for mid range speeds without the need for any additional hardware.

It is another object of the present invention to provide a method and apparatus to clean the EGR valve and/or system including no extra components and at no extra cost.

It is yet another object of the present invention to provide a method and apparatus to add a cleaning cycle into the ECM system.

It is yet another object of the present invention to provide a method and apparatus to achieve improved retarding performance.

It is yet another object of the present invention to provide a method and apparatus to achieve increased engine braking power.

It is an additional object of the present invention to provide a method and apparatus to optimize engine braking with engine speed.

It is another object of the present invention to provide different levels of engine braking.

It is yet another object of the present invention to provide a method and apparatus for closed loop control of engine braking.

It is therefore an object of the present invention to provide a method and apparatus to reduce engine braking noise.

It is another object of the present invention to provide a method and apparatus to avoid exhaust system overheating.

It is an additional object of the present invention to provide a method and apparatus that is lower in cost and more efficient than a Variable Geometry Turbo ("VGT") system.

It is another object of the present invention to provide a method and apparatus to improve engine braking by providing a split exhaust manifold and a dual-entry turbo.

It is yet another object of the present invention to provide increased Exhaust Gas Recirculation ("EGR").

It is an additional object of the present invention to provide a more stable EGR with decreased pulsation.

It is therefore an object of the present invention to provide a method and apparatus to permit an increased rate of engine acceleration following engine braking.

It is an additional object of the present invention to provide a method and apparatus to control emissions by recirculating exhaust gas to the engine cylinders.

It is therefore an object of the present invention to provide a method and apparatus to recirculate exhaust gas during compression release braking.

It is yet another object of the present invention to provide a method and apparatus to optimize the magnitude of the exhaust gas recirculation event for compression release braking operation.

Additional objects and advantages of the invention are set forth, in part, in the description which follows and, in part, will be apparent to one of ordinary skill in the art from the description and/or from the practice of the invention.

DETAILED DESCRIPTION OF THE INVENTION

Figure 1:
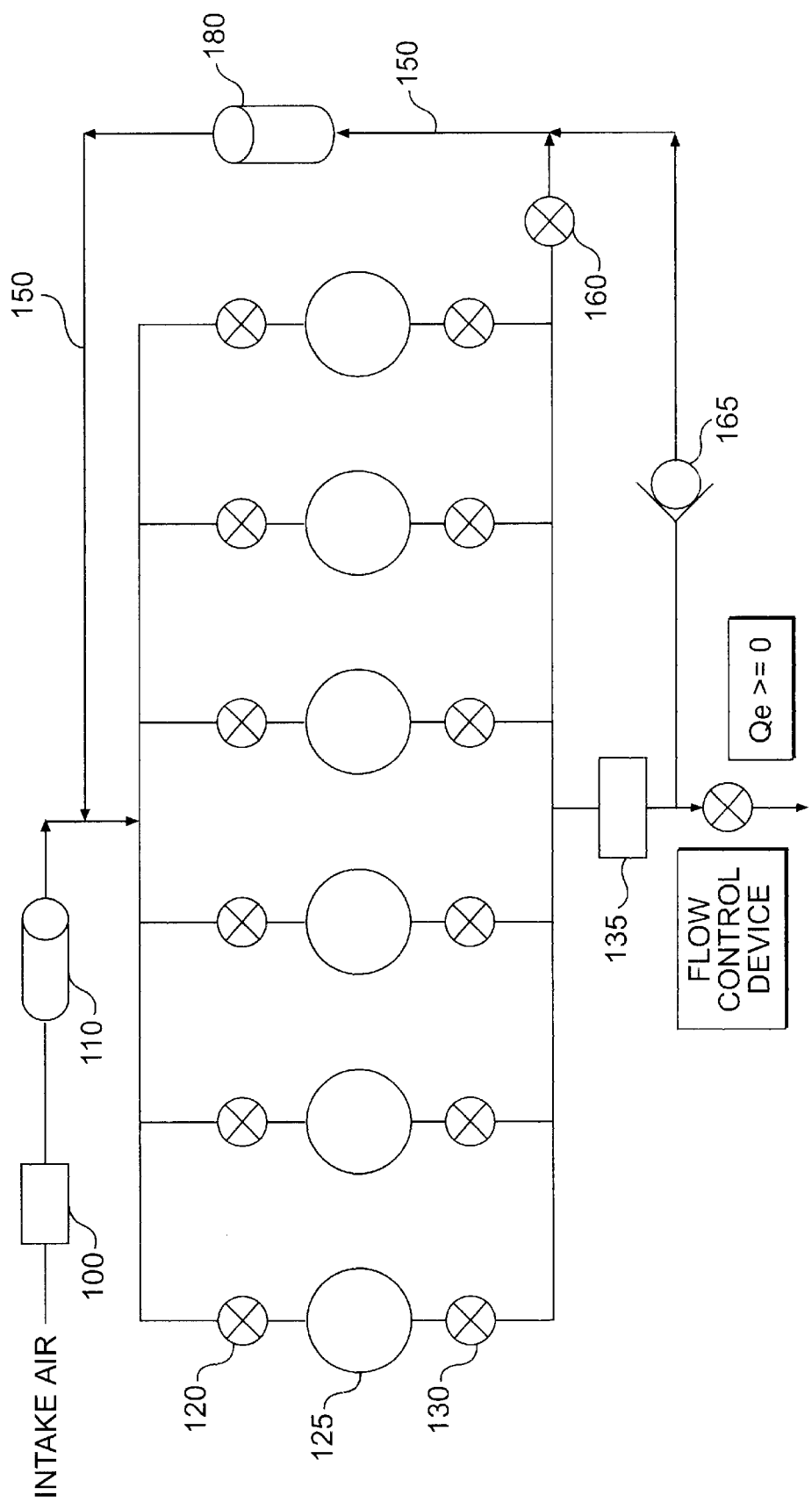
FIG. 1 is a schematic view illustrating an embodiment of the present invention.

An embodiment of the present invention is shown in FIG. 1. Exhaust gas is created during a combustion reaction in a combustion engine, which comprises intake valves 120, cylinders 125 and exhaust valves 130. In one embodiment of the present invention, an exhaust gas recirculation valve 160 associated with an exhaust gas recirculation passage 150 is opened briefly during a braking event and exhaust gas created during a combustion reaction is released into the exhaust gas recirculation passage 150. The exhaust passage 150 provides a path from the exhaust manifold to the intake manifold. The intake manifold comprises a compressor 100 and an inter-cooler 110.

Alternatively, the exhaust gas recirculation valve 160 remains closed, or is not included in the embodiment of the invention, and the exhaust gas created during the combustion reaction is shunted into a variable geometry turbo 135. Following the passage of the gas through the variable geometry turbo 135, a check valve 165 is opened briefly during a braking event and the exhaust gas is directed into the exhaust gas recirculation passage 150.

In a preferred embodiment of the present invention, the exhaust gas, once in the exhaust gas recirculation passage 150, is cooled by an exhaust gas recirculation cooling means 180 associated with the gas recirculation passage 150. When the exhaust gas cooling means 180 is present, a by-pass may also be provided such that the exhaust need not be cooled by the exhaust gas cooling means 180. After passing through or by-passing the exhaust cooling means 180, the exhaust gas is directed through the intake manifold and is introduced into the combustion engine whereby the air charge in the cylinder increases.

Figure 2:
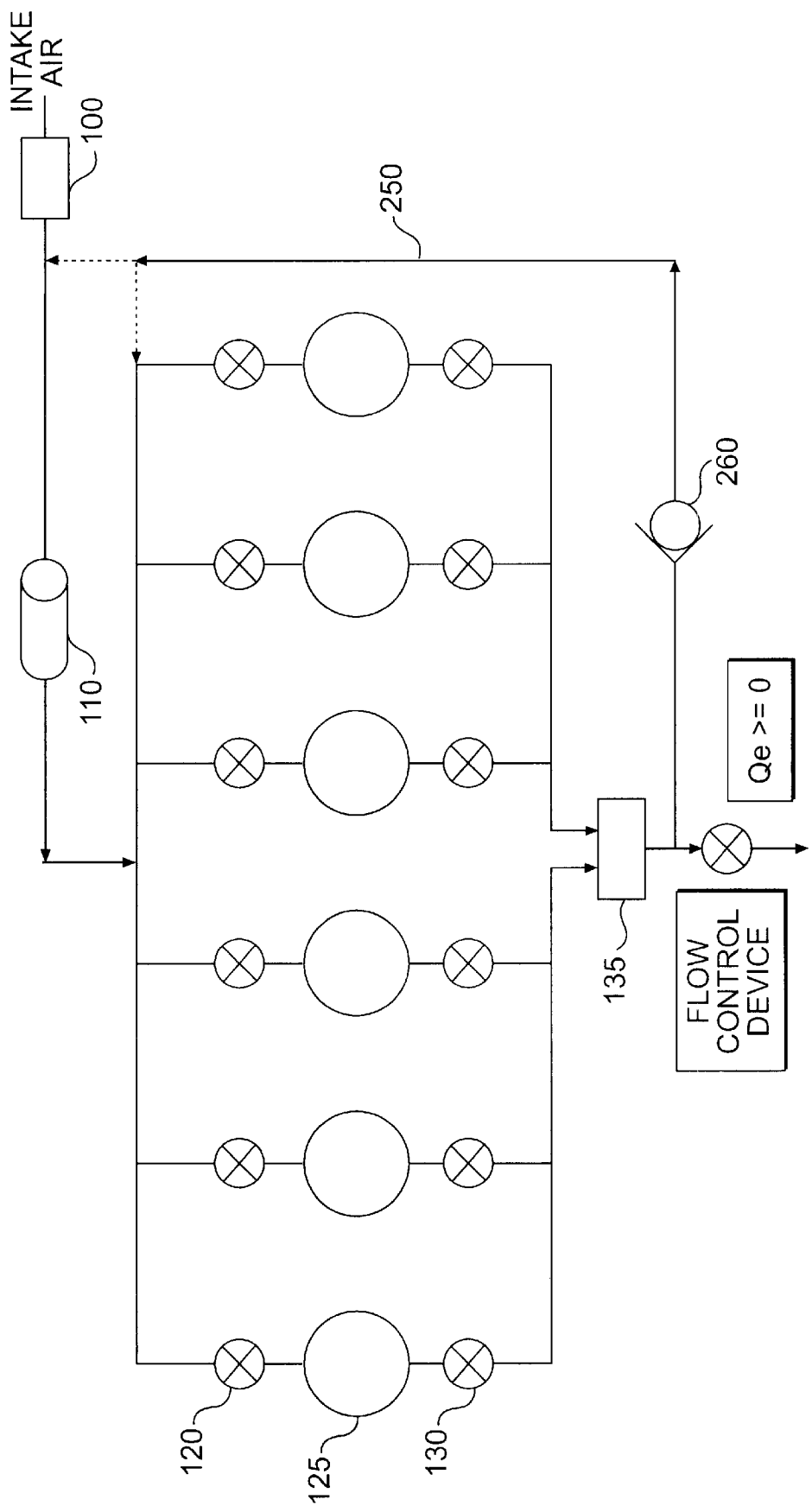
FIG. 2 is a schematic view illustrating an alternative embodiment of the present invention.
Figure 3:
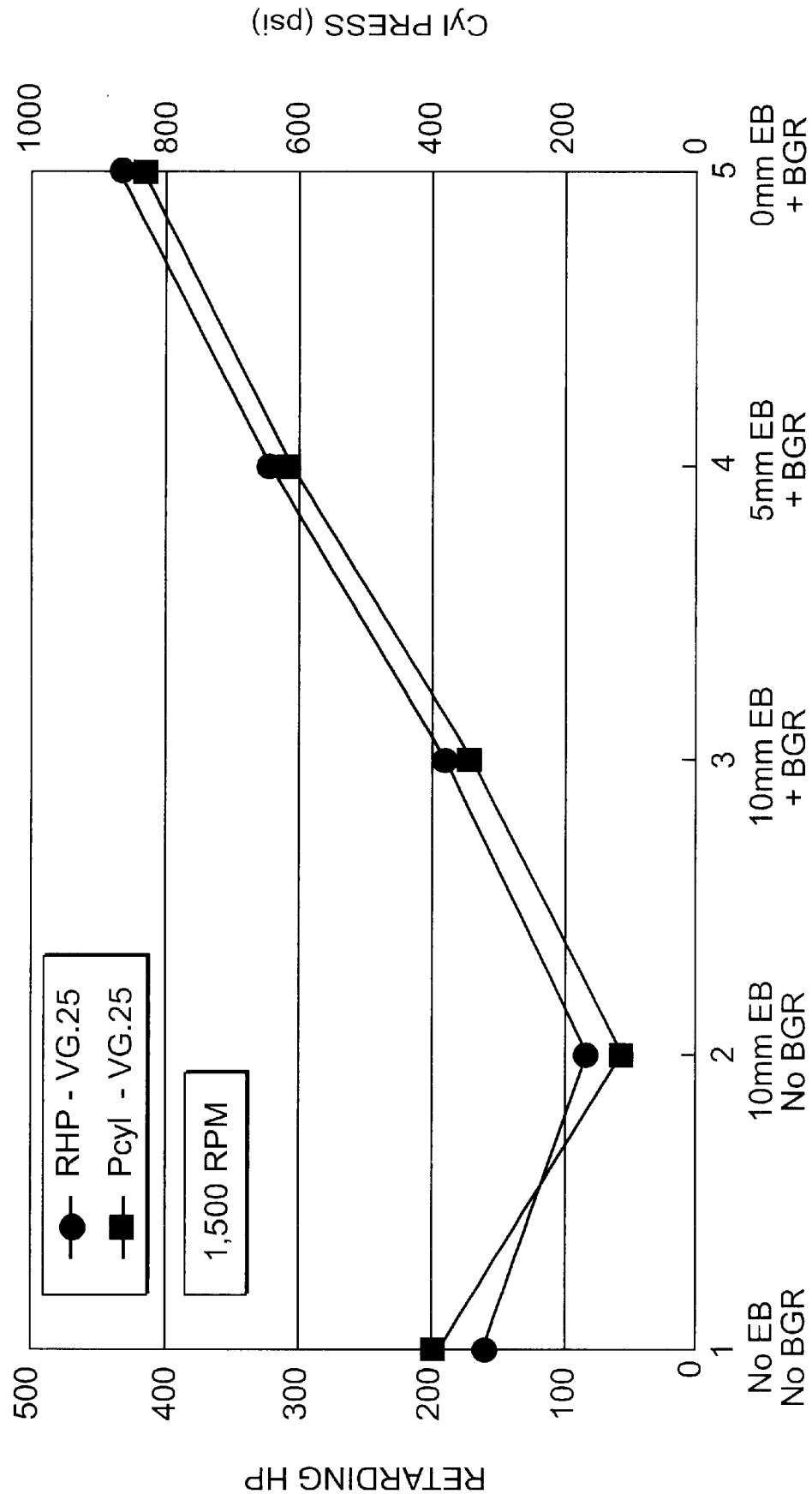
FIG. 3 is a graph illustrating retarding horsepower and cylinder pressure during Braking Gas Recirculation ("BGR") in an embodiment of the present invention.
Figure 4:
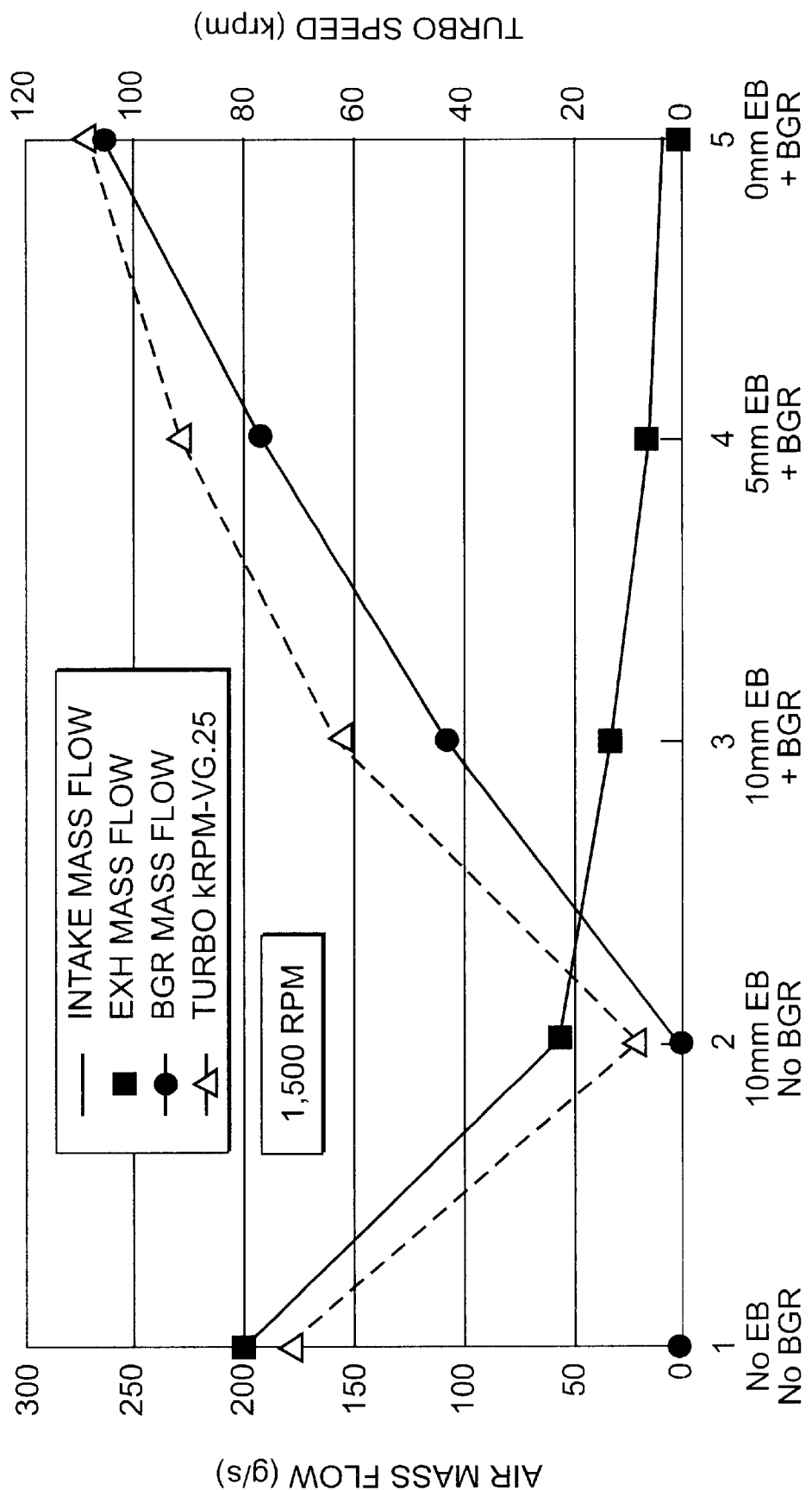
FIG. 4 is a graph illustrating air mass flow and turbo speed during BGR in an embodiment of the present invention.
Figure 5:
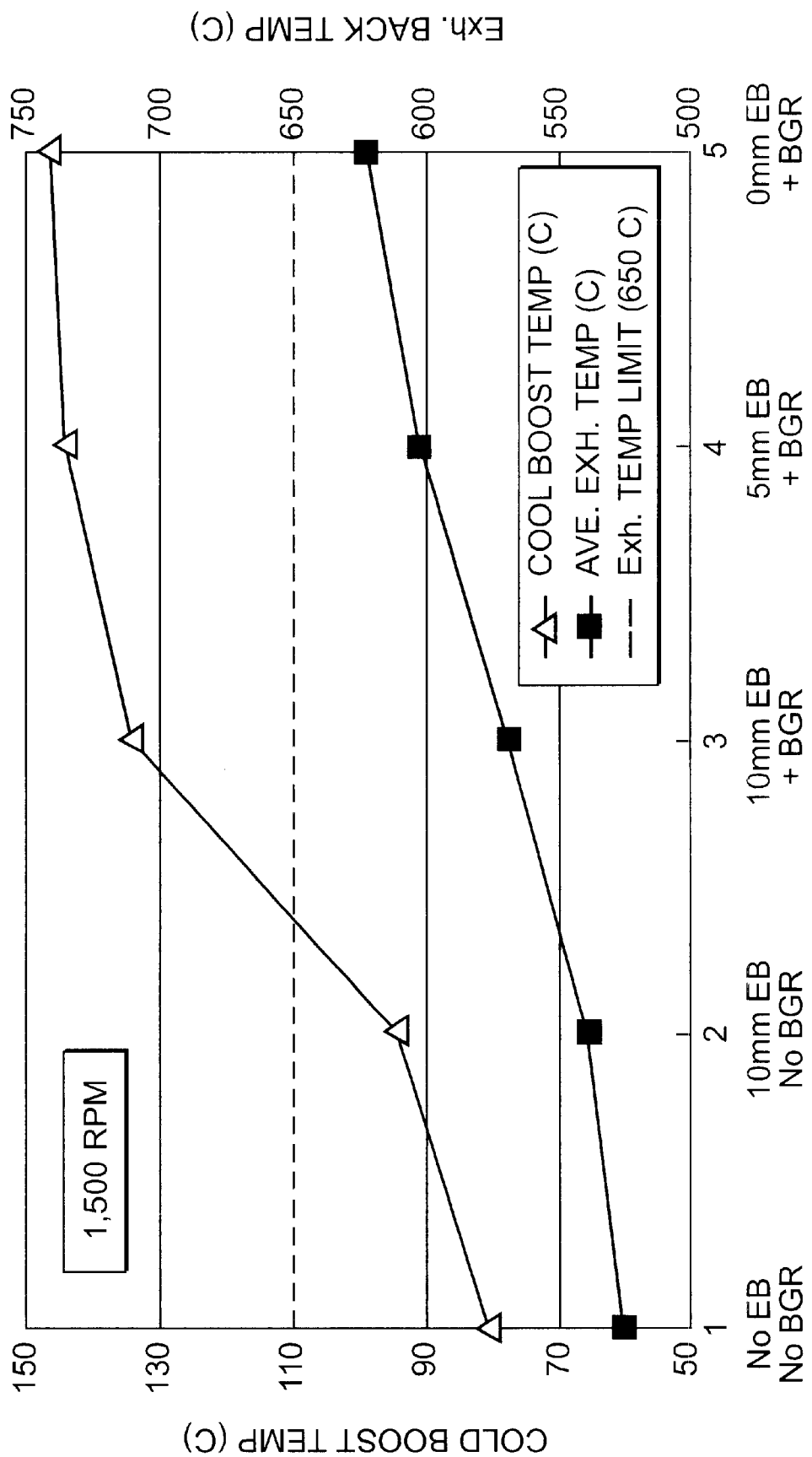
FIG. 5 is a graph illustrating cold boost temperature and exhaust back temperature during BGR in an embodiment of the present invention.
Figure 6:
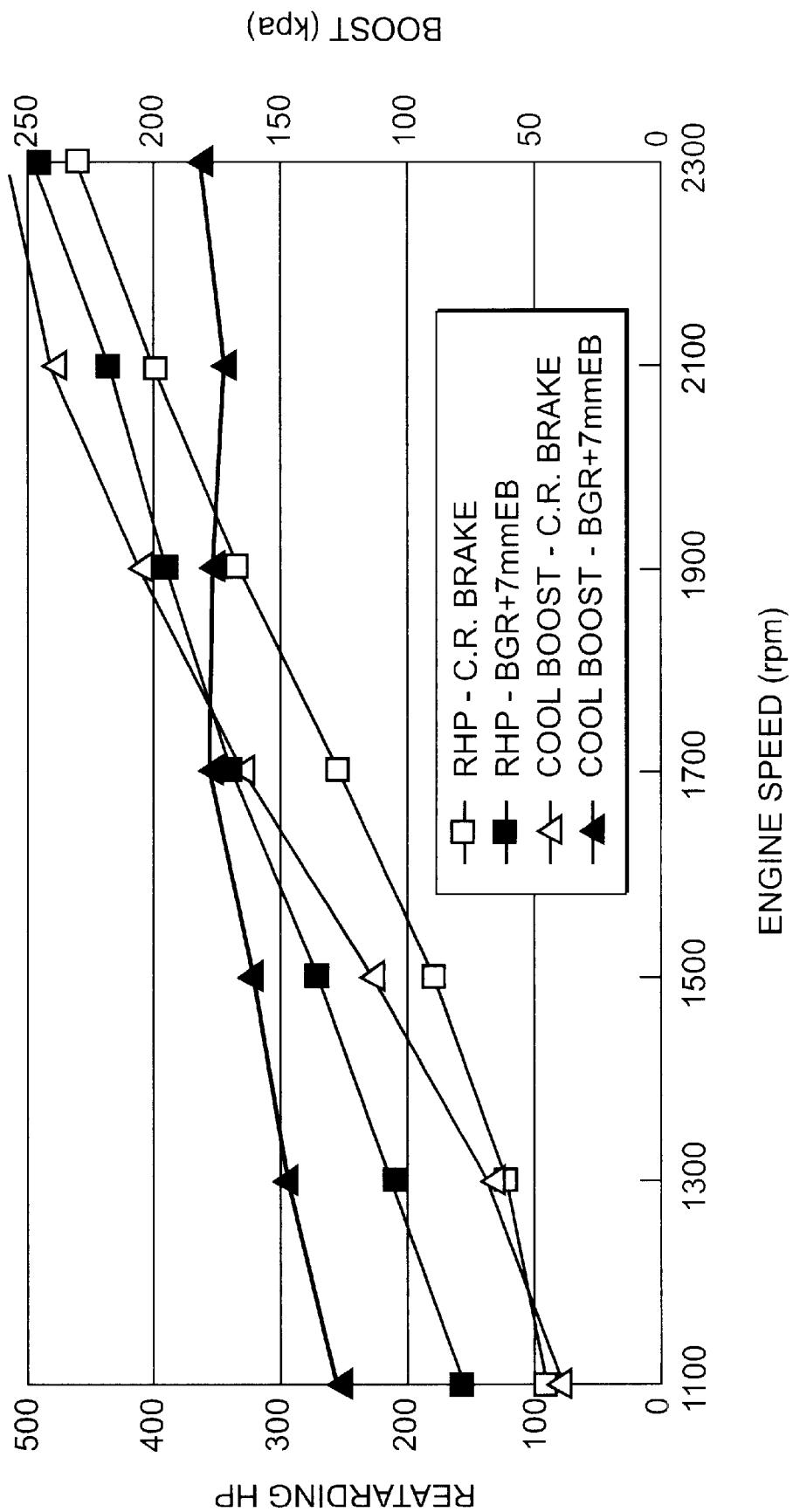
FIG. 6 is a graph illustrating retarding horsepower and boost at varying engine speeds during BGR in an embodiment of the present invention.
Figure 7:
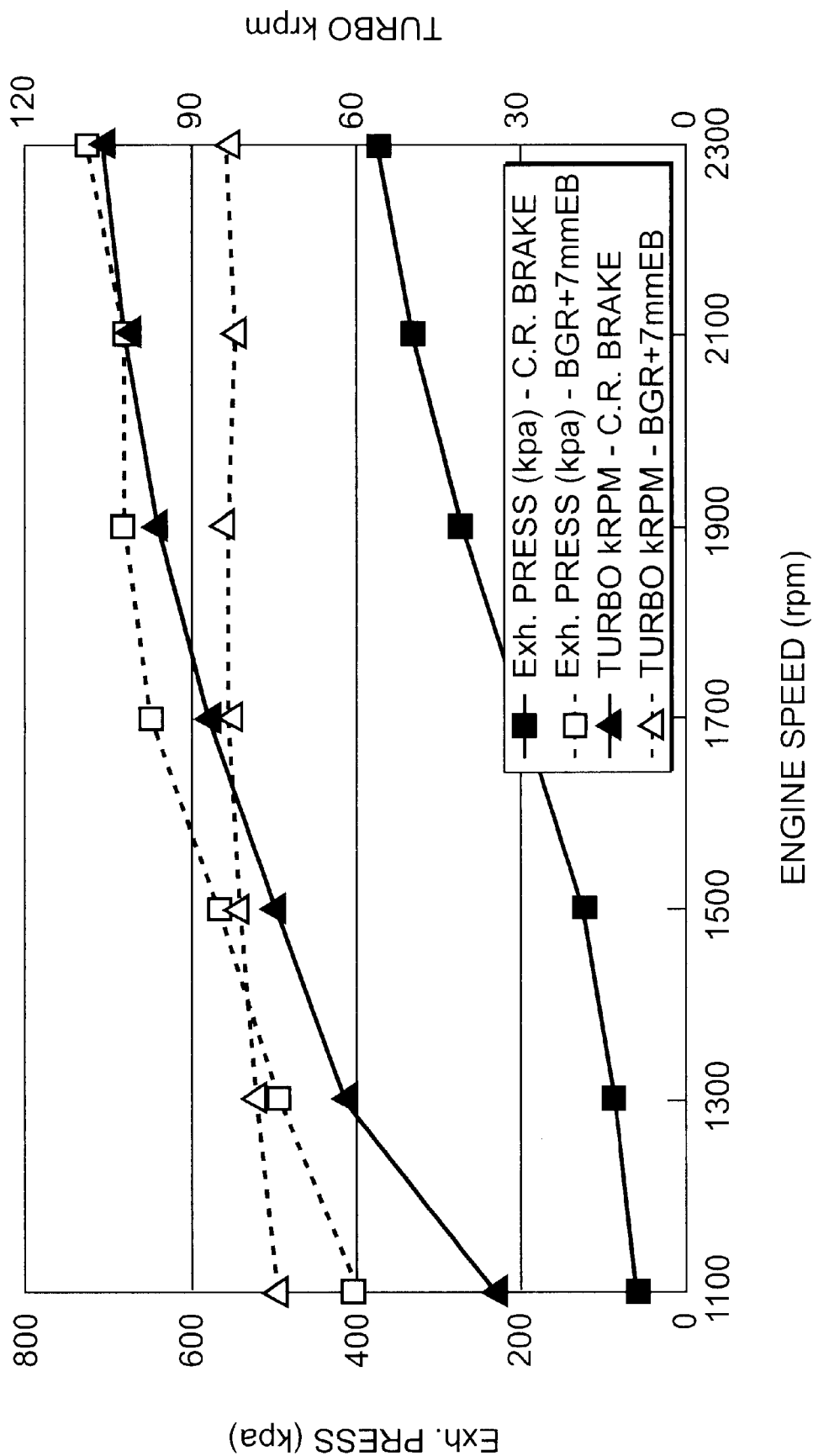
FIG. 7 is a graph illustrating exhaust pressure and turbo speed at varying engine speeds during BGR in an embodiment of the present invention.

FIG. 2 illustrates another embodiment of the present invention. The above described intake manifold is associated with a compression release braking system, such as an exhaust braking system. A brake gas recirculation passage 250 provides a path from the compression release braking system to the intake manifold. A compression pulse is created during a braking event. A brake gas recirculation valve 260 is opened briefly and the compression pulse is released into the brake gas recirculation passage 250. After passing through the brake gas recirculation passage, the compression pulse is then directed into the intake manifold. The compression pulse is either directly introduced into the combustion engine or passes through the inter-cooler before being directed into the combustion engine. Once directed into the combustion engine, the compression pulse increases the air charge in the cylinder 125.

In another embodiment of the present invention, the above described compression release braking system may be associated with a variable geometry turbo 135, an exhaust gas recirculation valve 160, an exhaust gas recirculation passage 150, and/or an exhaust gas recirculation system. The above mentioned components tend to become very sooted during normal engine use, which may then lead the components to bind or stick. A compression pulse from the above mentioned compression release braking system can be introduced into this exhaust gas recirculation and may aid in clean the components of deposited soot. The cleaning function can be activated (1) at a predetermined time cycle when braking occurs; (2) based on a soot level indicator activating the system on the next braking event; (3) based on an engine light to recommend braking "soon"; and/or (4) manually by the operator from the cab, possibly based on an indicator light or a recommended cleaning cycle.

Similarly to the above mentioned components, the intercooler 110 may be associated with the exhaust gas recirculation system. During normal use of the engine, the intercooler 110 may become clogged with accumulated soot. Introducing the compression release brake event through this system, would send a high pressure pulse that would remove accumulated soot within this system and will even re-circulate the soot back through the engine where is can be re-burned. This eliminates one of the largest concerns for the longevity and durability of the external exhaust gas recirculation system. In addition, if the pressure pulse travels through to the intake system, the pulse could help clean the intake air filter element.

What is claimed is:

1. A method for retarding an internal combustion engine, comprising the steps of:
   providing a gas recirculation passage connecting an exhaust manifold to an intake manifold;
   providing at least one compression release means associated with the gas recirculation passage and the exhaust manifold;
   creating at least one compression event;
   opening the compression release means;
   releasing the at least one compression event from the exhaust manifold into the gas recirculation passage after a first compression event;
   redirecting the first compression event into the intake manifold; and using the first compression event to increase air charge in a cylinder.

2. A gas recirculation system for improving engine braking in an internal combustion engine having an intake valve, an exhaust valve, and a cylinder, said gas recirculation system comprising:
   an exhaust manifold operatively connected to the cylinder through the exhaust valve;
   an intake manifold operatively connected to the cylinder through the intake valve;
   a gas recirculation passage connecting said exhaust manifold to said intake manifold;
   means for controlling the flow of gas from the cylinder, said flow control means operatively connected to said exhaust manifold; and
   a valve disposed in said gas recirculation passage having a first position for selectively recirculating gas from said exhaust manifold to said intake manifold through said gas recirculation passage during an engine braking event and a second position for directing the gas from the exhaust manifold through said flow control means.

3. The system of claim 2, wherein said flow control means comprises:
   a variable geometry turbocharger operatively connected to said exhaust manifold; and
   a flow control device located downstream of said variable geometry turbocharger.

4. The system of claim 3, further comprising a bypass line for recirculating gas to said intake manifold when said valve is in the second position.

5. The system of claim 4, further comprising a check valve disposed in said bypass line.

6. The system of claim 2, further comprising means cooling the recirculated gas disposed in said gas recirculation passage.

7. The system of claim 6, further comprising a means for bypassing said cooling means.

8. The system of claim 2, further comprising means for indicating the soot level in said gas recirculation system.

9. The system of claim 8, wherein said indicating means activates said gas recirculation system during an engine braking event.

10. A method of improving engine braking using gas recirculation in an internal combustion engine having an intake valve, an exhaust valve, an intake manifold, an exhaust manifold, and a cylinder, said method comprising the steps of:
    providing a first valve disposed in a gas recirculation passage connecting the exhaust manifold to the intake manifold;
    generating a gas pulse during an engine braking event;
    selectively operating the first valve during the engine braking event;
    recirculating the gas pulse to the intake manifold; and
    increasing the air charge in the cylinder.

11. The method of claim 10, wherein the step of operating the valve further comprises the step of closing the first valve during the engine braking event.

12. The method of claim 11, further comprising the steps of:
    providing means for controlling the flow of the gas pulse; and
    directing the gas pulse through the flow control means.

13. The method of claim 10, further comprising the step of cooling the recirculated gas pulse.

14. The method of claim 10, further comprising the steps of:
    determining a level of soot in the gas recirculation system; and
    indicating the soot level to an operator of the system.

* * * * *

UNITED STATES PATENT AND TRADEMARK OFFICE
CERTIFICATE OF CORRECTION

PATENT NO. : 6,584,954 B2
DATED : July 1, 2003
INVENTOR(S) : Robb Janak et al.

It is certified that error appears in the above-identified patent and that said Letters Patent is hereby corrected as shown below:

<u>Title page,</u>
Item [76], Inventors, please add the name -- Zhou Yang, 8 Diggins Ct., South Windsor, CT (US) 06074 as a listed inventor.

Signed and Sealed this

Fourteenth Day of October, 2003

JAMES E. ROGAN
*Director of the United States Patent and Trademark Office*